(12) United States Patent
Strackharn et al.

(10) Patent No.: US 11,402,605 B2
(45) Date of Patent: Aug. 2, 2022

(54) SCANNING MIRROR HAVING BALANCING BODY, AND METHOD FOR BALANCING A SCANNING MIRROR

(71) Applicant: Scanlab GmbH, Puchheim (DE)

(72) Inventors: Mathias Strackharn, Puchheim (DE); Manuel Winkler, Puchheim (DE)

(73) Assignee: Scanlab GmbH, Puchheim (DE)

(*) Notice: Subject to any disclaimer, the term of this patent is extended or adjusted under 35 U.S.C. 154(b) by 525 days.

(21) Appl. No.: 16/472,880

(22) PCT Filed: Dec. 12, 2017

(86) PCT No.: PCT/EP2017/082475
§ 371 (c)(1),
(2) Date: Jun. 23, 2019

(87) PCT Pub. No.: WO2018/114488
PCT Pub. Date: Jun. 28, 2018

(65) Prior Publication Data
US 2019/0331876 A1 Oct. 31, 2019

(30) Foreign Application Priority Data
Dec. 23, 2016 (DE) ...................... 10 2016 125 670.6

(51) Int. Cl.
*G02B 26/08* (2006.01)
*G02B 7/182* (2021.01)
(Continued)

(52) U.S. Cl.
CPC ........... *G02B 7/1821* (2013.01); *G02B 7/198* (2013.01); *G02B 26/105* (2013.01)

(58) Field of Classification Search
CPC .... G02B 7/1821; G02B 7/198; G02B 26/105; G02B 26/08
(Continued)

(56) References Cited

U.S. PATENT DOCUMENTS

| 4,477,226 A | 10/1984 | Carreno |
| 2005/0046979 A1* | 3/2005 | Hiley .................... G02B 7/182 359/877 |

(Continued)

FOREIGN PATENT DOCUMENTS

| CN | 104 567 814 A | 4/2015 |
| DE | 198 13 718 A1 | 10/1999 |

(Continued)

OTHER PUBLICATIONS

German Patent Office Search Report, dated Aug. 16, 2017.
(Continued)

*Primary Examiner* — Euncha P Cherry
(74) *Attorney, Agent, or Firm* — Dority & Manning, P.A.

(57) ABSTRACT

A scanning mirror for a laser scanning system includes a central axis, a mirror body, and a mirror surface on a front face of the mirror body. A first recess group is provided and includes a plurality of first recesses formed in the mirror body and arranged on a side of and spaced from the central axis as viewed from a back of the scanning mirror. A balancing mass is accommodated by the first recess group and includes at least one balancing body seated in at least one of the first recesses for balancing the scanning mirror. Each of the first recesses includes at least one radial stop against which the balancing body rests such that the balancing body is held in the first recess at a constant distance from the central axis. A method is also provided for balancing the scanning mirror.

15 Claims, 3 Drawing Sheets

(51) Int. Cl.
*G02B 7/198* (2021.01)
*G02B 26/10* (2006.01)
(58) Field of Classification Search
USPC ...................................... 359/224.1
See application file for complete search history.

(56) References Cited

U.S. PATENT DOCUMENTS

2013/0027761 A1   1/2013   Brown
2014/0152972 A1   6/2014   Robertson et al.

FOREIGN PATENT DOCUMENTS

| DE | 10 2006 057 391 A1 | 6/2008 |
| DE | 10 2009 047619 A1 | 6/2011 |
| DE | 10 2012 102 566 A1 | 9/2013 |
| EP | 0 868 976 A2 | 10/1998 |
| EP | 2 860 546 A1 | 4/2015 |
| JP | H04186215 A | 7/1992 |
| JP | H06208075 A | 7/1994 |
| JP | 2000 338443 A | 12/2000 |
| WO | WO 2008/081081 A1 | 7/2008 |
| WO | WO 2013/019430 A1 | 2/2013 |

OTHER PUBLICATIONS

PCT Search Report, dated Mar. 15, 2018.
IPRP, dated Jul. 4, 2019.
Chinese Examination Report, dated Dec. 9, 2020.

* cited by examiner

SCANNING MIRROR HAVING BALANCING BODY, AND METHOD FOR BALANCING A SCANNING MIRROR

FIELD OF THE INVENTION

The present invention relates to a scanning mirror for a laser scanning system, in particular a laser processing scanner and/or a sensor scanner of a laser processing device, comprising a mirror body and a mirror surface arranged on a front face of the scanning mirror. At least one first recess is formed in the mirror body, which is arranged on one side of a central axis of the scanning mirror, as viewed on the back of the scanning mirror, and is spaced apart from the central axis. At least one balancing body is provided, which is accommodated in the first recess and forms at least one part of a balancing mass for balancing the scanning mirror. Moreover, the invention relates to a method for balancing a scanning mirror, in which an imbalance of the scanning mirror is measured and the scanning mirror is balanced with the aid of balancing bodies.

BACKGROUND

Scanning mirrors, which are moved in a highly dynamic manner, i.e., for example, are rotated in a highly dynamic manner in a limited angular range, and, therefore, are optimized with respect to inertia, are frequently made of materials such as quartz or silicon, since these materials are very stiff at low weight and can be machined to an extremely low flatness. A thread can be introduced into these materials only with the greatest amount of effort. In addition, in the case of a scanning mirror optimized with respect to inertia, efforts are made to add as little mass as possible during balancing. The flatness of the mirror surface can be adversely affected by large or unfavorably positioned recesses in the rear face or the lateral faces of the mirror body or in the mirror body itself.

A scanning mirror is known from WO 2013/019430 A1, which comprises multiple screws, which have been screwed into a thread of the scanning mirror and act as counterweight. With the aid of the thread, the particular position of the screws or the counterweights can be changed, whereby a balancing of the mirror can take place. It is disadvantageous in this case that the thread is extremely complex to produce, whereby the manufacturing costs of the scanning mirror are considerably increased. Moreover, the method for balancing the scanning mirror is highly complex, since a plurality of iterative steps is required in order to be able to determine the optimal distance of the screws from the central axis.

SUMMARY OF THE INVENTION

Additional objects and advantages of the invention will be set forth in part in the following description, or may be obvious from the description, or may be learned through practice of the invention.

A problem addressed by the present invention is therefore that of creating a balanced scanning mirror and a method for balancing the scanning mirror so that the scanning mirror can be manufactured quickly, cost-effectively, and/or without sacrificing the mirror quality.

The problem is solved by a scanning mirror and a method for balancing a scanning mirror having the features set forth herein.

The invention relates to a scanning mirror for a laser scanning system, in particular a laser processing scanner and/or a sensor scanner of a laser processing device. The scanning mirror is therefore utilized for deflecting a laser beam, with the aid of which, for example, an object can be produced, in particular in a rapid prototyping process an object can be machined, in particular cut, welded, or engraved, medical treatments can be carried out, and/or data can be gathered with the aid of sensors, The scanning mirror comprises a mirror body and a mirror surface arranged on the front face of the scanning mirror. The mirror body is therefore utilized as a support of the mirror surface. Moreover, the scanning mirror comprises at least one first recess formed in the mirror body. The at least one first recess is arranged on one side of a central axis of the scanning mirror, as viewed on the back of the scanning mirror, in particular in the transverse direction of the mirror, and is spaced apart from the central axis. As viewed on the back, the central axis therefore divides the scanning mirror into a right first half and a left second half. The first recess is therefore arranged in the area of one of the two halves and is spaced apart from the central axis. When the scanning mirror is utilized as intended, the central axis preferably forms a rotational axis, about which the scanning mirror—which forms at least one part of a rotor of the laser scanning system—can rotate. Moreover, the scanning mirror comprises at least one balancing body, which is accommodated in the first recess. The balancing body forms at least one part of a balancing mass, which must be arranged on the scanning mirror so as to be spaced apart from the central axis, in order to balance the scanning mirror, in particular by displacing the center of gravity in a plane parallel to the rear face.

The scanning mirror comprises a first recess group for accommodating the entire balancing mass. The first recess group is formed from multiple first recesses arranged on the same side of the central axis, as viewed on the back, and spaced apart from the central axis. Advantageously, the scanning mirror can therefore be balanced quickly and cost-effectively, in that the entire balancing mass required for balancing the scanning mirror is accommodated in the at least two first recesses at a fixedly predefined and/or constant distance to the central axis. The at least one balancing body must therefore no longer be repeatedly displaced in the transverse direction of the scanning mirror, in a complex balancing process, in order to be able to determine the optimal balance position. Instead, the balancing mass is determined and is quickly and easily introduced into at least one of the first recesses and is held by the recess at a constant distance to the central axis. As a result, expensive threads for displacing the balancing body can be saved during production, whereby the manufacturing costs of the scanning mirror can be reduced. Moreover, materials can also be utilized for the mirror body, which do not allow for the introduction of a thread, or do so only at a considerably increased cost. Due to the fact that the scanning mirror is balanced with the aid of the first recess group comprising multiple first recesses, which accommodates the balancing mass in the transverse direction of the scanning mirror at least one fixedly predefined and/or constant distance to the central axis, the scanning mirror can be very quickly and cost-effectively balanced. The balanced scanning mirror is therefore optimized with respect to inertia and comprises a very flat mirror surface, since the recesses are preferably introduced in such a way that the recesses essentially have no effect on the mirror surface.

It is advantageous when the scanning mirror comprises a second recess group, which is formed from multiple second recesses. The second recess group is arranged, in this case, as compared to the first recess group, on the other or opposite side of the central axis, as viewed on the back of the scanning mirror. Advantageously, therefore, at least one balancing body can be quickly and cost-effectively arranged in one of the two recess groups either on the right side of the central axis or on the left side of the central axis as viewed on the back of the scanning mirror. Depending on the nature of the imbalance, the balancing mass can therefore be arranged in at least one of the recesses either in the first recess group or on the other side in the second recess group. As a result, a fast and uncomplicated balancing of the scanning mirror can take place. If an error has occurred during balancing, the error can be quickly and cost-effectively corrected, in that at least one correction body, which forms an error-correcting counterweight to the balancing mass, is introduced into the other of the two recess groups, in which the balancing mass has not been introduced or which is still empty.

In an advantageous enhanced embodiment of the invention, at least some of the recesses of the first recess group and/or the second recess group are off-set with respect to one another in the direction of the central axis. As a result, at least two recesses can be formed at the same distance to the central axis. Preferably, the recesses of the first recess group and/or the second recess group have an equidistant distance from one another in the direction of the central axis. The distance in the direction of the central axis between two adjacent recesses preferably corresponds at least to a recess width measured in the direction of the central axis.

Moreover, it is advantageous when the recesses of the first recess group and/or the second recess group all have the same distance to the central axis. The recesses of the particular recess group are therefore arranged one behind the other on a line parallel to the central axis. The balancing mass can therefore be affected only by the number of balancing bodies and their particular mass, since their distance to the central axis is the same in each of the recesses.

Additionally or alternatively, it is advantageous when at least two recesses of the first recess group and/or the second recess group have different distances to the central axis. As a result, the effect of the balancing body can be further affected by the selection of the distance or the recess arranged at the particular distance to the central axis. Therefore, if a recess is selected that has a shorter distance to the central axis, its balancing body must have a greater mass in order to achieve the same effect as a second—relative thereto—balancing body, which has a smaller mass and is arranged in another recess of the particular recess group, which, relative thereto, is arranged at a greater distance to the central axis. Alternatively, if a balancing body having a given mass is present, its effect is that much greater, the greater the distance of the recess—in which the balancing body has been introduced—to the central axis is.

It is advantageous when the first recesses and/or the second recesses are designed to be identical to one another. As a result, the manufacturing costs of the scanning mirror can be reduced, since all recesses can be formed using the same tool and one after the other or simultaneously.

It is advantageous when the two recess groups are arranged symmetrically with respect to one another, as viewed on the back of the scanning mirror, wherein the central axis preferably forms the axis of symmetry.

It is advantageous when no balancing body is arranged in at least one of the first recesses and/or second recesses. As a result, the total weight of the scanning mirror can be kept as low as possible, whereby higher dynamics of the scanning mirror are ensured. In this regard, it is advantageous, in particular, when at least one of the first recesses has been equipped with a balancing body and none of the second recesses has a balancing body. Advantageously, the balancing mass is therefore arranged on only one of the two sides of the scanning mirror or in only one of the two recess groups. One of the two recess groups therefore has no balancing body. The recess group equipped with the balancing mass comprises at least so many recesses that all balancing bodies forming the balancing mass can be accommodated. When the balancing mass to be accommodated is appropriately small, it may therefore happen that at least one recess or the recess group accommodating the balancing mass remains free, while the other recesses of this recess group are equipped with an appropriate balancing body. Only in the case of a balancing error may it happen that at least one correction body is also arranged in the free recess group, in which the balancing mass was not arranged. The correction body is preferably designed as a balancing body in this case.

In an advantageous enhanced embodiment of the invention, the recesses are each designed in such a way that a balancing body intended therefor can be accommodated so as to be immovable at least in the direction of the central axis. The recesses are therefore designed in such a way that they hold a balancing body arranged therein in the transverse direction of the scanning mirror at a constant distance to the central axis. In this regard, it is advantageous when the recesses each comprise at least one radial stop, with the aid of which a balancing body resting against it is consistently held at a constant distance to the central axis. Preferably, the recesses can comprise a first radial stop, with the aid of which at least one balancing body is held radially inward. The balancing body therefore cannot move radially inward. The first radial stop therefore forms a radial inner stop. Preferably, the recesses can comprise a second radial stop, with the aid of which at least one balancing body is held radially outward. The balancing body therefore cannot move radially outward. The second radial stop therefore forms a radial outer stop. As a result, a fast and cost-effective balancing of the scanning mirror can take place, since a lengthy and complex balancing process is not required, as was the case up to now, in order to determine the optimal distance of the balancing body relative to the central axis. Instead, all that is necessary to arrange as many balancing bodies at a fixedly predefined and/or constant distance to the central axis as necessary until the entire, in particular previously determined, balancing mass has been accommodated at a fixedly predefined and/or constant distance to the central axis.

In order to be able to produce the recesses quickly and cost-effectively and, furthermore, to also be able to quickly and easily equip the recesses with balancing bodies, it is advantageous when all recesses of the first recess group and/or the second recess group are each formed in the same side or face of the mirror body. Preferably, all recesses of the first recess group and/or the second recess group are formed in a rear face of the mirror body facing away from the mirror surface. Alternatively, the recesses can also be formed, however, in a lateral face of the mirror body, which connects the front face to the rear face. In the case of a recess formed in the rear face, the recess therefore extends from the rear face in the direction of the front face. The mirror body therefore comprises two diametrically opposed first lateral faces, which are spaced apart from the central axis, and two diametrically opposed second lateral faces, which extend perpendicularly to the central axis. In the case of a recess formed in the lateral face, the recess extends from the lateral face in the direction of the central axis.

It is advantageous when the recesses comprise an opening for the introduction of a balancing body. The opening is preferably formed on the rear face or on one of the two lateral faces. It can be advantageous when each recess has a separate opening. Alternatively, it is likewise conceivable that multiple recesses comprise a common opening.

It is advantageous when the mirror body is designed as a solid body. As a result, the recesses can be formed directly in the mirror body. Moreover, it is advantageous when the mirror body is made of quartz or silicon and/or, in particular, is a quartz or silicon substrate. It is advantageous when the recesses of the first recess group and/or the second recess group extend from the rear face in the direction of the front face or from one of the two lateral faces in the direction of the central axis in the mirror body, which is preferably designed as a solid body.

The scanning mirror can be produced particularly cost-effectively when at least one of the recesses of the first recess group and/or the second recess group is designed as an, in particular, bored, blind hole.

Additionally or alternatively, it is advantageous when at least two recesses of the first recess group and/or the second recess group are formed by a common groove extending, in particular, in parallel to the central axis. In this case, the two recesses comprise a common opening for the introduction of at least one balancing body.

In order to be able to avoid a deformation of the mirror surface during the formation of the recesses and/or during the introduction of the at least one balancing body, it is advantageous when the recesses, in particular the blind hole and/or the groove, are spaced apart from the mirror surface, as viewed on the side of the scanning mirror. In this case, it is advantageous when the distance is preferably at least one-half the depth of the mirror body. Moreover, it is advantageous, in particular in the case of a recess formed on the rear face, when the depth of the recess preferably corresponds, at most, to 50%, in particular, at most, to 33% of the thickness of the mirror body.

In order to be able to ensure a fast and uncomplicated introduction of the balancing body into the recesses provided therefor, it is advantageous when the at least one balancing body is a ball. Moreover, it is advantageous when the at least one balancing body has been pushed into the associated recess. The exact position of the balancing body in the recess is therefore not established with the aid of a thread. Instead, the balancing body is preferably pushed up to the base of the particular recess, whereby its position is unchangeably established by a wall of the recess. In the case of a recess formed on the lateral face, the constant distance of the balancing body intended therefor is therefore established by the base of the recess. In the case of a recess formed in a rear face of the mirror body, the constant distance of the balancing body intended therefor to the central axis is established by a lateral face facing the central axis or a lateral surface section of the recess.

In order to be able to ensure that a balancing body arranged in the recess does not unintentionally detach from the recess, it is advantageous when the balancing body is preferably completely accommodated in the recess. In this regard, it is likewise advantageous when the depth of the recess is at least half as great, in particular greater than or equal to, a ball diameter of the ball. Additionally or alternatively, it is advantageous when the diameter of the recess is greater than or equal to the ball diameter of the ball.

It is advantageous when the scanning mirror comprises at least two balancing bodies, which, together, form the balancing mass and/or are each accommodated in one of the recesses, in particular unchangeably and/or at a constant distance to the central axis, of the first recess group and/or the second recess group.

It is advantageous when the scanning mirror comprises at least two balancing bodies of equal volume. Additionally or alternatively, it is advantageous when at least two balancing bodies have the same mass and/or different masses with respect to one another. The balancing bodies can be made, for example, of stainless steel, hard metal, lead, or resin. It is advantageous when two balancing bodies having different masses with respect to one another are designed in such a way that one of the two balancing bodies has twice the mass of the other balancing body.

Moreover, it is advantageous when the at least one balancing body is held in the associated recess, at least in the transverse direction of the scanning mirror, in a form-locking manner and/or is fastened in the recess in an integrally-joined manner. In this regard, it is advantageous, in particular, when the balancing body is glued in, in particular with the aid of a quick-curing adhesive. Additionally or alternatively, it is advantageous when at least one of the recesses, in particular their opening, is sealed. This preferably takes place with the aid of an adhesive.

The invention relates to a deflection unit comprising a rotor, which is rotatable about a rotational axis and comprises a scanning mirror which is designed according to the preceding description, wherein the mentioned features can be present individually or in any combination. Preferably, the rotor comprises a mirror holder which is connected, at one of its two ends, to the scanning mirror and/or is coupled at its other end to a drive unit, in particular a galvanometric drive.

The invention also relates to a method for balancing a scanning mirror and/or a deflection unit, which are/is preferably designed according to the preceding description, wherein the mentioned features can be present individually or in any combination. In the method, an imbalance of the scanning mirror is measured. Thereafter, the scanning mirror is balanced with the aid of a balancing body. For this purpose, multiple recesses spaced apart from a central axis, as viewed on the back of the scanning mirror, in particular a first recess group and/or a second recess group, are initially introduced into a mirror body. The recesses can each hold a balancing body intended therefor at a constant distance to the central axis. A balancing body is introduced into at least one of the recesses in order to balance the scanning mirror. Advantageously, therefore, a complex and lengthy method is not required in order to determine the appropriate distance of the balancing mass to the central axis. Instead, the balancing mass is defined by the number of balancing bodies. The balancing bodies can therefore be positioned quickly and easily at a constant distance to the central axis, whereby the balancing method can be carried out very easily and quickly. As a result, in turn, the manufacturing costs of the scanning mirror can be reduced.

It is advantageous when all recesses are formed before the balancing is carried out. As a result, it can be ensured that additional recesses do not need to be introduced into the mirror body during the balancing, which could result in damage to the mirror surface.

It is also advantageous when the mirror surface is formed on the mirror body only after the introduction of all recesses. As a result, it can be ensured that the mirror surface is not deformed due to the introduction of a recess.

Moreover, it is advantageous when an imbalance of the scanning mirror is measured after the formation of the recesses and/or after the formation of the mirror surface. Moreover, in this regard, it is advantageous when one of the two sides or one of the two recess groups, onto which/into which the at least one balancing body is to be placed, with respect to the central axis as viewed on the back of the scanning mirror, is selected as a function of the measured imbalance. Moreover, in this regard, it is advantageous when one of the two recess groups, in which at least one balancing body is to be placed, is selected as a function of the measured imbalance. As a result, it can be determined, on which of the two sides the balancing mass is to be placed in order to be able to eliminate the measured imbalance of the scanning mirror.

Moreover, it is advantageous when a balancing mass is calculated as a function of the distance from the central axis of the recesses located on the selected side. Additionally or alternatively, it is advantageous, in this regard, when a number of balancing bodies to be installed, of which preferably at least two have an identical volume and/or different masses with respect to one another, is determined as a function of the determined balancing mass.

Thereafter, it is advantageous when the calculated balancing mass on the established side is arranged in the established recesses.

It is advantageous when the imbalance of the scanning mirror is measured again after the introduction of the at least one balancing body and/or a further balancing body is arranged, in particular on the same side, when an imbalance is detected again.

BRIEF DESCRIPTION OF THE DRAWINGS

Further advantages of the invention are described in the following exemplary embodiments. Wherein.

DETAILED DESCRIPTION

Figure 1:
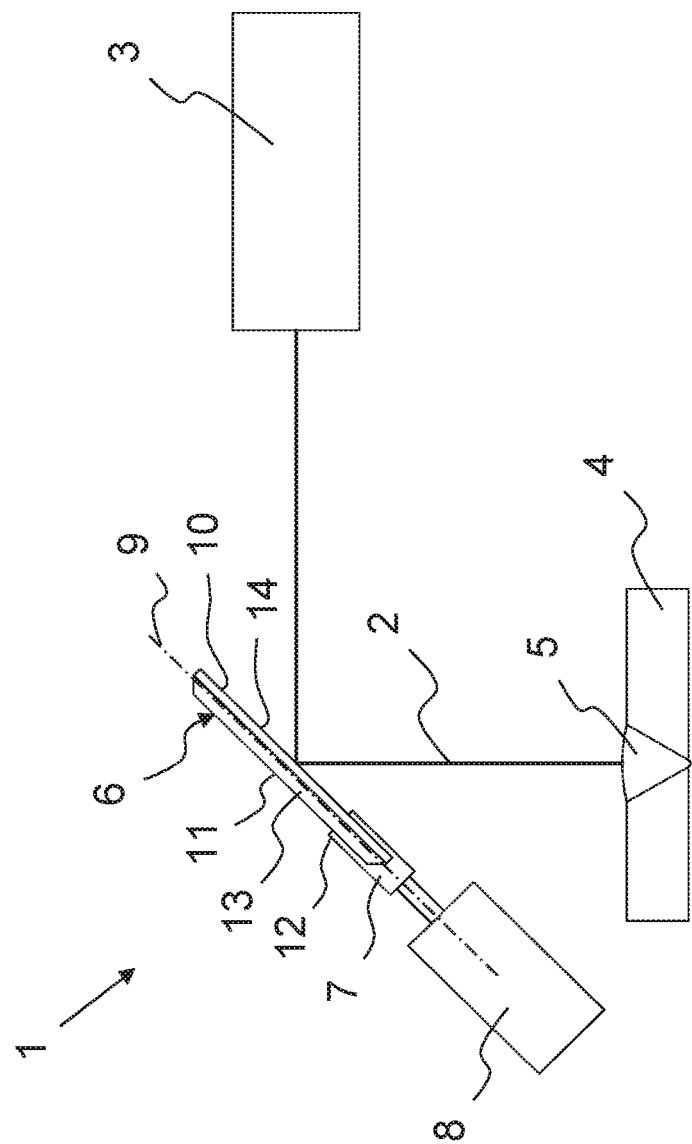
FIG. 1 shows a schematic representation of a laser scanning system for processing a workpiece.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a section of a laser scanning system 1, with the aid of which a laser beam 2 of a laser 3 can be deflected. The laser beam 2 is utilized, in this case, for forming a weld 5 on a workpiece 4. The laser beam 2 is emitted from the laser 3 and is deflected onto the workpiece 4 by a scanning mirror 6 of the laser scanning system 1. The scanning mirror 6 is mounted so as to be rotatable about a rotational axis 9.

The scanning mirror 6 is held by a mirror holder 7 for this purpose. The mirror holder 7 engages on a front face 10 and a rear face 11 of the scanning mirror 6 in a force-locking, integrally-joined, and/or form-locking manner.

The scanning mirror 6 and the mirror holder 7 form at least one part of a rotor 12, which can be rotated about the rotational axis 9 within a limited angular range. This takes place with the aid of a drive 8, which is preferably a galvanometer drive. The laser beam 2 can therefore be moved on the workpiece 4 with the aid of a rotary motion transmitted via the drive 8 onto the rotor 12. In addition or as an alternative to welding, the laser scanning system 1 can also be utilized for laser cutting, laser engraving, for moving a sensor laser beam, for medical treatments, and/or for rapid prototyping.

Figure 2:
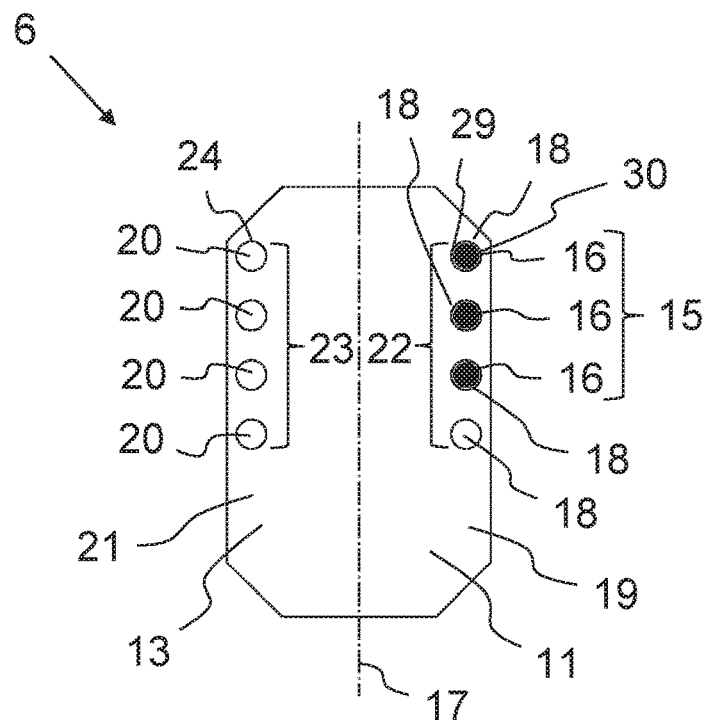
FIG. 2 shows a back view of first exemplary embodiment of a scanning mirror comprising multiple recesses for balancing the scanning mirror.

According to FIGS. 1 and 2, the scanning mirror 6 comprises a mirror body 13. The mirror body 13 forms a support body of the scanning mirror 6. The mirror body 13 is preferably made of a quartz and/or silicon substrate. Moreover, the mirror body 13 is preferably designed as a solid body. In addition to the mirror body 13, the scanning mirror 6 also comprises a mirror surface 14. The mirror surface 14 is formed on a front face 10. The mirror surface 14 is preferably polished and coated.

Since, in particular, the scanning mirror 6, but also the mirror holder 7 and/or the drive 8, is subject to tolerances, the mass distribution is not designed to be completely symmetrical with respect to the rotational axis 9. Due to this non-ideal mass distribution, forces occur during a movement of the scanning mirror 6, which excite various vibrational modes, including bending vibrations of the rotor 12. These bending vibrations have a negative effect on the deflection accuracy of the scanning mirror 6. In order to reduce the bending-vibration excitations, such scanning mirrors 6 are balanced with the aid of a balancing mass 15 (cf. FIG. 2).

FIG. 2 shows a back view of a first exemplary embodiment of the scanning mirror 6. The mirror holder 7 (not represented here) can be arranged in the lower area of the scanning mirror 6 per the figure. The scanning mirror 6 represented in FIG. 2 is balanced with the aid of the balancing mass 15. In this case, the balancing mass 15 is formed from multiple balancing bodies 16. The balancing bodies 16 are all arranged on the same side of a central axis 17 of the scanning mirror 6. The central axis 17 therefore divides the scanning mirror 6 into two halves, wherein the entire balancing mass 15 is arranged on only one of the two halves. According to the present exemplary embodiment, the central axis 17 forms an axis of symmetry in the represented back view of the scanning mirror 6. In the intended use of the scanning mirror 6 represented in FIG. 1, the central axis 17 further forms the rotational axis 9 of the rotor 12.

The scanning mirror 6 comprises multiple first recesses 18. The recesses 18 are arranged, relative to the central axis 17, in an area of a first side 19 or half of the rear face 11. Moreover, the scanning mirror 6 comprises multiple second recesses 20. The recesses 20 are formed, relative to the central axis 17, on a second side 21 or second half opposite the first side 19. In this case, the scanning mirror 6 comprises four first recesses 18 and four second recesses 20.

The first recesses 18 are spaced apart from the central axis 17 toward the first side 19 in the back view per the figure. In this case, all first recesses 18 have the same distance to the central axis 17, in particular in the radial direction, according to the back view per the figure, as represented in FIG. 2. The recesses 18 are therefore arranged with respect to one another on a line parallel to the central axis 17.

The first recesses 18 form a first recess group 22. Likewise, the second recesses 20 form a second recess group 23. The second recesses 20 also all have the same distance to the central axis 17 in the radial direction according to the back view of the scanning mirror 6 per the figure. The recesses 20 are therefore likewise arranged one behind the other on a line parallel to the central axis 17.

Preferably, the recesses of the first recess group 22 and/or the second recess group 23 are spaced apart from one another in the direction of the central axis 17, as in the exemplary embodiment represented in FIG. 2. The distances between two recesses 18, 20 spaced apart from one another in the longitudinal direction are preferably mutually equidistant. Moreover, the distance between two adjacent recesses 18, 20 of a group is preferably at least as great as the width of the particular recesses 18, 20 in the direction of the central axis 17. Alternatively, one of the recesses 18, 20 can be spaced apart from the central axis 17 at least as far as one-half the width or the full width of the particular recess 18, 20 in the direction of the central axis 17.

The two recess groups 22, 23 are designed to be symmetrical to one another. The central axis 17 forms an axis of symmetry of the two recess groups 22, 23. The recesses 18, 20 of the recess group 22, 23, respectively, are designed to be identical to one another and/or to the other recess group 22, 23.

In this case, the recesses 18, 20 are designed as blind holes. Moreover, the recesses 18, 20 are formed in the rear face 11 of the scanning mirror 6. According to the cutaway view represented in FIG. 3, the recesses 18, 20 therefore extend from the rear face 11 in the direction of the mirror surface 14. Alternatively, in an embodiment, which is not represented here, the recesses 18, 20 could also be formed on a lateral face of the mirror body 13, so that the recesses 18, 20 extend essentially in the transverse direction of the scanning mirror 6. The mirror body therefore comprises two diametrically opposed first lateral faces, which are spaced apart from the central axis 17, and two diametrically opposed second lateral faces which extend perpendicularly to the central axis 17. At least one of the recesses 18, 20 could therefore be additionally or alternatively formed in one of the first or second lateral faces.

The recesses 18, 20 each comprise at least one radial stop 29, 30, with the aid of which a balancing body 16 resting against it is consistently held or can be consistently held at a constant distance to the central axis 17. For the sake of clarity, only one of the recesses is provided with applicable reference numerals. The recesses 18, 20, which are designed, in particular, as blind holes in this case, each comprise a first radial stop 29, with the aid of which a balancing body 16 is held or can be held radially inward. The balancing body 16 therefore cannot move radially inward. The first radial stop 29 therefore forms a radial inner stop. Moreover, the recesses 18, 20 comprise a second radial stop 30, with the aid of which at least one balancing body 16 is held or can be held radially outward. The balancing body 16 therefore cannot move radially outward. The second radial stop 30 therefore forms a radial outer stop. The first radial stop 29 is therefore formed by a radial inner blind hole area. The second radial stop 30 is therefore formed by a radial outer blind hole area.

Figure 3:
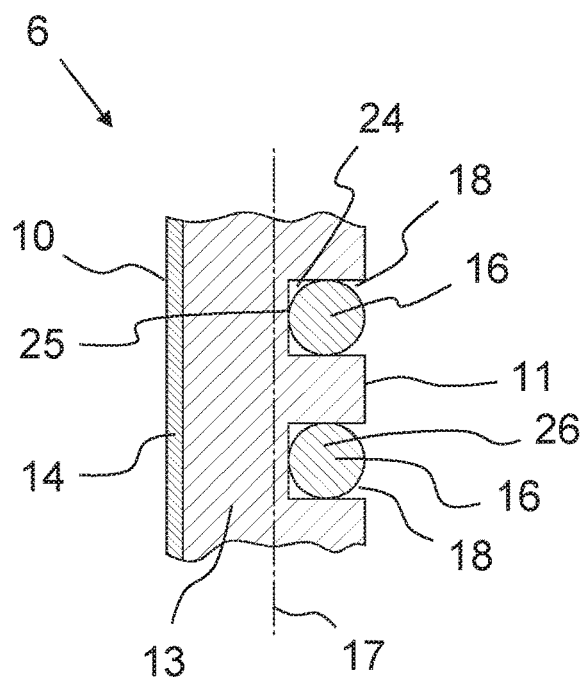
FIG. 3 shows a lateral partial cutaway view of the scanning mirror represented in FIG. 2 in the area of the recesses equipped with balancing bodies.

According to FIG. 3, the recesses 18, 20 have a distance from the mirror surface 14. A base 25 of the recesses 18, 20 is therefore spaced apart from the mirror surface 14. Moreover, the recesses 18, 20 do not extend past the central axis 17, and so the base 25 of the particular recess 18, 20 also has a distance to the central axis 17 or the rotational axis 9.

The recesses 18, 20 are designed to be so deep that the balancing bodies 16 are completely accommodated in the recesses 18, 20, as represented in this case. Alternatively, the balancing bodies 16 could also be accommodated by only at least up to one-half. They would therefore partially protrude from the recesses 18, 20.

In this case, the balancing bodies 16 are designed as balls 26 (cf. FIG. 3). As a result, the balancing bodies 16 can be quickly and easily slid into the associated recess 18, 20. The depth and/or width of the recesses 18, 20 preferably corresponds to a diameter of the balls 26. Alternatively, the balancing bodies can also be cylindrical. For example, a wire section can also be utilized as a balancing body.

According to FIGS. 2 and 3, the balancing bodies 16 are designed to be identical to one another with respect to their outer design and/or their volume. The balancing bodies 16 can also have different masses with respect to one another, however. Therefore, it is advantageous when at least one of the balancing bodies 16 has a density, which is considerably different, in particular twice as great, as another one of the balancing bodies 16. As a result, the balancing mass 15 necessary for balancing can be determined sufficiently precisely with the aid of the externally identical balancing bodies 16.

In order to manufacture the balanced scanning mirror 6 represented in FIGS. 2 and 3, the mirror body 13 is initially formed in a first step. The mirror body 13 is formed, in particular, from quartz or silicon. Thereafter, the two recess groups 22, 23 are formed on the rear face 11 of the scanning mirror 6. This takes place, in particular, with the aid of multiple blind bore holes on the rear face. Thereafter, the mirror surface 14 is polished and coated on the front face 10. The mirror surface 14 could also be formed already before the introduction of the recesses 18, 20 on the mirror body 13. The number of recesses 18, 20 of the first recess group 22 and the second recess group 23, respectively, is selected in such a way that the entire balancing mass 15 required for balancing the scanning mirror 6 can be accommodated on one of the two sides 19, 21 or in one of the two recess groups 22, 23 of the scanning mirror 6. In this case, each recess group 23, 22 comprises four recesses 18, 20, respectively.

After the recesses 18, 20 have been formed, an imbalance of the scanning mirror 6 is measured first of all. This takes place, in particular, when the scanning mirror 6 is coupled to the mirror holder 7 and to the drive 8. The imbalance of the total system can now be compensated for by installing the balancing mass 15. For this purpose, the side 19, 21 or the recess group 22, 23 at which the particular balancing mass 15 must be accommodated is determined first of all by measuring the imbalance. Thereafter, the balancing mass 15 to be accommodated is determined as a function of the distance of the particular recesses 18, 20 from the central axis 17. Moreover, the number and/or the type or mass of the balancing body 16 to be accommodated are/is determined. With respect to the latter, the material of which the equal-volume balancing bodies 16 are to be made is essentially determined. This takes place by making a selection from an available material group, wherein the balancing bodies 16 can be made, for example, of stainless steel, hard metal, lead, or resin.

After the balancing mass 15—i.e., the number of balancing bodies 16, the type of balancing body 16, and the recesses 18, 20, in which the balancing bodies 16 are to be accommodated—has been established, the balancing bodies 16 are arranged in the particular established recess group 22, 23. According to the exemplary embodiment represented in FIG. 2, the imbalance of the scanning mirror 16 is formed in such a way that the balancing bodies 16 must be arranged in the first recess group 22 in order to compensate for the imbalance. In an exemplary embodiment, which is not represented here, the imbalance can also be formed in such a way, however, that the balancing mass 15 is arranged in the second recess group 23 and not in the first recess group 22. Preferably, the balancing bodies 16 are accommodated in the particular assigned recess 18 in an accurately fitting manner. The balancing bodies 16 are adhesively bonded into the recesses 18 in order to be fixed in position. This preferably takes place with the aid of a quick-curing adhesive.

After the balancing bodies 16 have been arranged, the imbalance of the scanning mirror 6 is measured again. If the imbalance is not within a predetermined tolerance range, an additional balancing mass 15 to be accommodated is calculated again. The at least one balancing body 16 determining the additional balancing mass 15 is then arranged—provided there was no measuring error—on the side 19 on which the other balancing bodies 16 are also already arranged. This process can be carried out in an iterative approximation method for as long as it takes for the imbalance of the scanning mirror 16 to be eliminated sufficiently well. According to FIG. 2, therefore, no balancing bodies 16 are arranged in the second recess group 23. Moreover, in addition, one of the first recesses 18 of the first recess group 22 is empty. This is the case because, with respect to the imbalance established in this case, three balancing bodies 16 have already sufficed for completely accommodating the balancing mass 15. In the case of a greater imbalance, the available balancing bodies 16 would have had to be designed having a greater mass and/or, possibly, an additional balancing body 16 would have to be arranged in the free first recess 18.

If too much balancing mass 15 is erroneously arranged in one of the two recess groups 22, 23 during the balancing process, it may happen that at least one correction weight (not represented here) must be arranged in the other recess group 22, 23, which is empty in the ideal case. The correction weight is preferably designed, in this case, as one of the balancing bodies 16 and represents a counterweight to the balancing mass 15.

Figure 4:
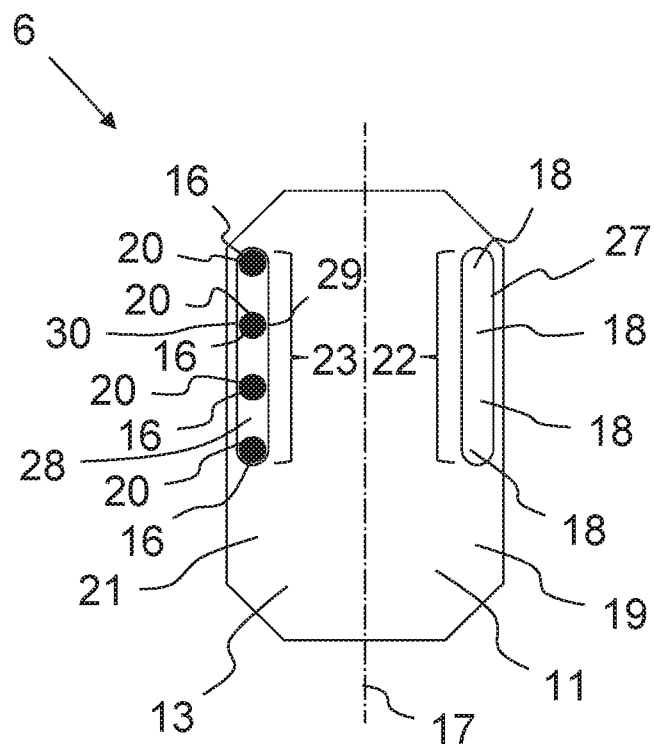
FIG. 4 shows a back view of a second exemplary embodiment of the scanning mirror.

FIG. 4 shows an alternative exemplary embodiment of the scanning mirror 6. In the following description of this alternative exemplary embodiment, identical reference numerals are utilized for features which are designed to be identical and/or at least comparable in terms of their embodiment and/or mode of operation as compared to the first exemplary embodiment represented in FIG. 2. If the features are not explained again in detail, their embodiment or mode of operation corresponds to the preceding description.

In contrast to the first exemplary embodiment represented in FIG. 2, in the second exemplary embodiment represented in FIG. 4, the recesses 18, 20 of the recess group 22, 23, respectively, are not spaced apart from one another in the direction of the central axis 17, but rather are connected to one another. The first recesses 18 of the first recess group 22 are formed by a common first groove 27 in this case. Moreover, the second recesses 20 of the second recess group 23 are formed by a second groove 28. The grooves 27, 28 are designed as longitudinal grooves in this case and extend in parallel to the central axis 17. According to FIG. 4, the balancing bodies 16 are accommodated in the second groove 28, spaced apart from one another. Alternatively, the balancing bodies 16 could also be shifted toward one end of the second groove 28, so that the balancing bodies 16 rest against one another. The balancing bodies 16 could be fixed in position with the aid of an adhesive.

As is also the case in the exemplary embodiment represented in FIG. 2, the recesses 18, 20 each comprise at least one radial stop 29, 30, with the aid of which a balancing body 16 resting against it is consistently held or can be consistently held at a constant distance to the central axis 17. For the sake of clarity, only one of the recesses is provided with applicable reference numerals. The recesses 18, 20, which are formed by the common grooves 27, 28 in this case, each comprise a first radial stop 29, with the aid of which a balancing body 16 is held or can be held radially inward. The balancing body 16 therefore cannot move radially inward. The first radial stop 29 therefore forms a radial inner stop. Moreover, the recesses 18, 20 comprise a second radial stop 30, with the aid of which at least one balancing body 16 is held or can be held radially outward. The balancing body 16 therefore cannot move radially outward. The second radial stop 30 therefore forms a radial outer stop. The first radial stop 29 is therefore formed by an inner groove wall of the groove 27, 28. The second radial stop 30 is therefore formed by an outer groove wall of the groove 27, 28.

Figure 5:
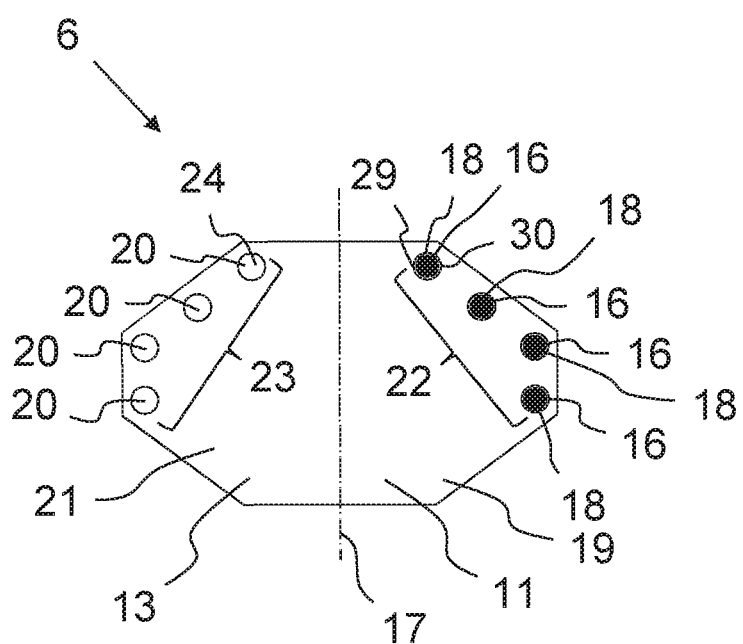
FIG. 5 shows a back view of a third exemplary embodiment of the scanning mirror.

FIG. 5 shows a third exemplary embodiment of the scanning mirror 6, wherein identical reference numerals are utilized for identical or at least functionally identical features in this case as well. According to the exemplary embodiment represented in FIG. 2, the recesses 18, 20 are designed, in particular, as blind holes and/or comprising at least one radial stop 29, 30. In contrast to the preceding exemplary embodiments, the scanning mirror 6 has another basic shape, wherein this basic shape is wider than it is tall. Moreover, the recesses 18, 20 of the recess groups 22, 23, respectively, do not have an identical distance to the central axis 17, i.e., in the transverse direction of the scanning mirror 6, as they do in the preceding exemplary embodiments. Instead, at least one part of the recesses 18, 20 of the recess groups 22, 23, respectively, has different distances to the central axis 17 in the radial direction or in the transverse direction of the scanning mirror 6. The uppermost recess 18, 20 per the figure is arranged closest to the central axis 17 and the two lowermost recesses 18, 20 are positioned furthest away from the central axis 17, at the same distance with respect to one another. A balancing body 16 arranged in the recess 18 positioned at the top or closer to the central axis 17 must therefore have a greater mass than a balancing body 16 arranged in the recess 18 positioned at the bottom or further away from the central axis in order to be able to achieve the same balancing effect.

In the aforementioned exemplary embodiments, the recesses 18, 20 are arranged in the area of the edge, and so they have a preferably great distance to the central axis 17. As a result, the balancing bodies 16 can be designed to be preferably small and having a smaller mass, whereby the dynamics of the scanning mirror are improved. Preferably, the recesses 18, 20 are spaced apart from the edge of the mirror by at least one width or one diameter of the particular recess 18, 20.

In an exemplary embodiment not represented here, multiple balancing bodies 16 could also be accommodated in one and/or the same recess. In this regard, therefore, at least one of the recesses 18, 20 and/or at least two of the balancing bodies could be designed in such a way that at least two balancing bodies 16 can be and/or are accommodated in the same recess 18, 20, one behind the other, in particular in an insertion and/or removal direction of the recess 18, 20. It is also conceivable that a bore hole is provided in a lateral face or in one of the end faces (i.e., the surfaces at the top or the bottom of the mirror body per FIG. 2), in which multiple balls can be accommodated "one on top of the other".

The present invention is not limited to the represented and described exemplary embodiments. Modifications within the scope of the claims are also possible, as is any combination of the features, even if they are represented and described in different exemplary embodiments.

LIST OF REFERENCE NUMERALS 1 laser scanning system
2 laser beam
3 laser
4 workpiece
5 weld
6 scanning mirror
7 mirror holder
8 drive
9 rotational axis
10 front face
11 rear face
12 rotor
13 mirror body
14 mirror surface
15 balancing mass
16 balancing body
17 central axis
18 first recess
19 first side
20 second recess
21 second side
22 first recess group
23 second recess group
24 blind hole
25 base
26 ball
27 first groove
28 second groove
29 first radial stop
30 second radial stop

The invention claimed is:

1. A scanning mirror for a laser scanning system, comprising:
   a mirror body;
   a mirror surface on a front face of the mirror body;
   a central axis;
   a first recess group comprising a plurality of first recesses formed in the mirror body and arranged on a side of and spaced from the central axis as viewed from a back of the scanning mirror;
   a balancing mass accommodated by the first recess group and comprising at least one balancing body seated in at least one of the first recesses for balancing the scanning mirror;
   each of the first recesses comprising at least one radial stop against which the balancing body rests such that the balancing body is held in the first recess at a constant distance from the central axis;
   a second recess group comprising a plurality of second recesses formed in the mirror body at an opposite side of the central axis as compared to the first recess croup and spaced from the central axis; and
   wherein at least one but not all of the first recesses contain one of the balancing bodies, and at least one of the second recesses does not contain one of the balancing bodies.

2. The scanning mirror according to claim 1, wherein a center of gravity of the scanning mirror is displaced in a balancing plane by location of the balancing mass in the first recess group such that the scanning mirror is balanced in the balancing plane.

3. The scanning mirror according to claim 1, wherein the first recesses and the second recesses are offset with respect to one another in a direction of the central axis and have the same or a different distance to the central axis.

4. The scanning mirror according to claim 1, wherein the first recesses and the second recesses are formed such that the balancing body seated therein is immovable along a direction of the central axis.

5. The scanning mirror according to claim 1, wherein the first recesses and the second recesses are formed in a common face of the mirror body, the common face comprising a rear face or a lateral face of the mirror body.

6. The scanning mirror according to claim 5, wherein the first recesses and the second recesses extend from the rear face towards the front face of the mirror body or extend from the lateral face into the mirror body towards the central axis.

7. The scanning mirror according to claim 1, wherein one or both of the first recesses and the second recesses are formed by blind holes in the mirror body.

8. The scanning mirror according to claim 1, wherein at least two of the first recesses are formed by a first common groove in the mirror body, and at least two of the second recesses are formed by a second common groove in the mirror body, the first and second common grooves extending parallel to the central axis.

9. The scanning mirror according to claim 1, wherein the balancing bodies comprise balls pushed into the first recesses, the ball resting against a base and a lateral face of the first recess, the ball recessed completely in the first recess or extending partially out of the first recess.

10. The scanning mirror according to claim 1, wherein the balancing mass comprises a plurality of the balancing bodies of equal-volume seated in the first recesses at a constant distance to the central axis.

11. The scanning mirror according to claim 10, wherein the equal-volume balancing bodies have the same or a different mass.

12. A method for balancing a scanning mirror, wherein the scanning mirror comprises a mirror body and a mirror surface on a front face of the mirror body; a central axis; a first recess group comprising a plurality of first recesses formed in the mirror body and arranged on a side of and spaced from the central axis as viewed from a back of the scanning mirror: a second recess group comprising a plurality of second recesses formed in the mirror body at an opposite side of the central axis as compared to the first recess group and spaced from the central axis; and
   wherein at least one but not all of the first recesses contain one of the balancing bodies, and at least one of the second recesses does not contain one of the balancing bodies, the method comprising:
   measuring an imbalance in the scanning mirror; and
   arranging a balancing mass in the first recess group to balance the scanning mirror by placing at least one balancing body into at least one of the first recesses.

13. The method according to claim 12, further comprising forming the first recess group and the second recess group before the balancing is carried out, and forming the mirror surface on the mirror body after forming the first recess group and the second recess group.

14. The method according to claim 13, wherein the measuring of the imbalance is carried out after formation of the first and second recesses and the mirror surface, and based on the measured imbalance one of the first or second recess groups is selected for installation of at least one balancing body, the total balancing mass calculated as a function of the distance of the first or second recesses from the central axis, and the number of balancing bodies determined as a function of the total balancing mass needed to balance the scanning mirror.

15. The method according to claim 14, wherein after the introduction of the balancing bodies, the imbalance is measured for again and a further balancing body is added to the first or second recess group when an imbalance still exists.

\* \* \* \* \*